United States Patent Office 2,715,766
Patented Aug. 23, 1955

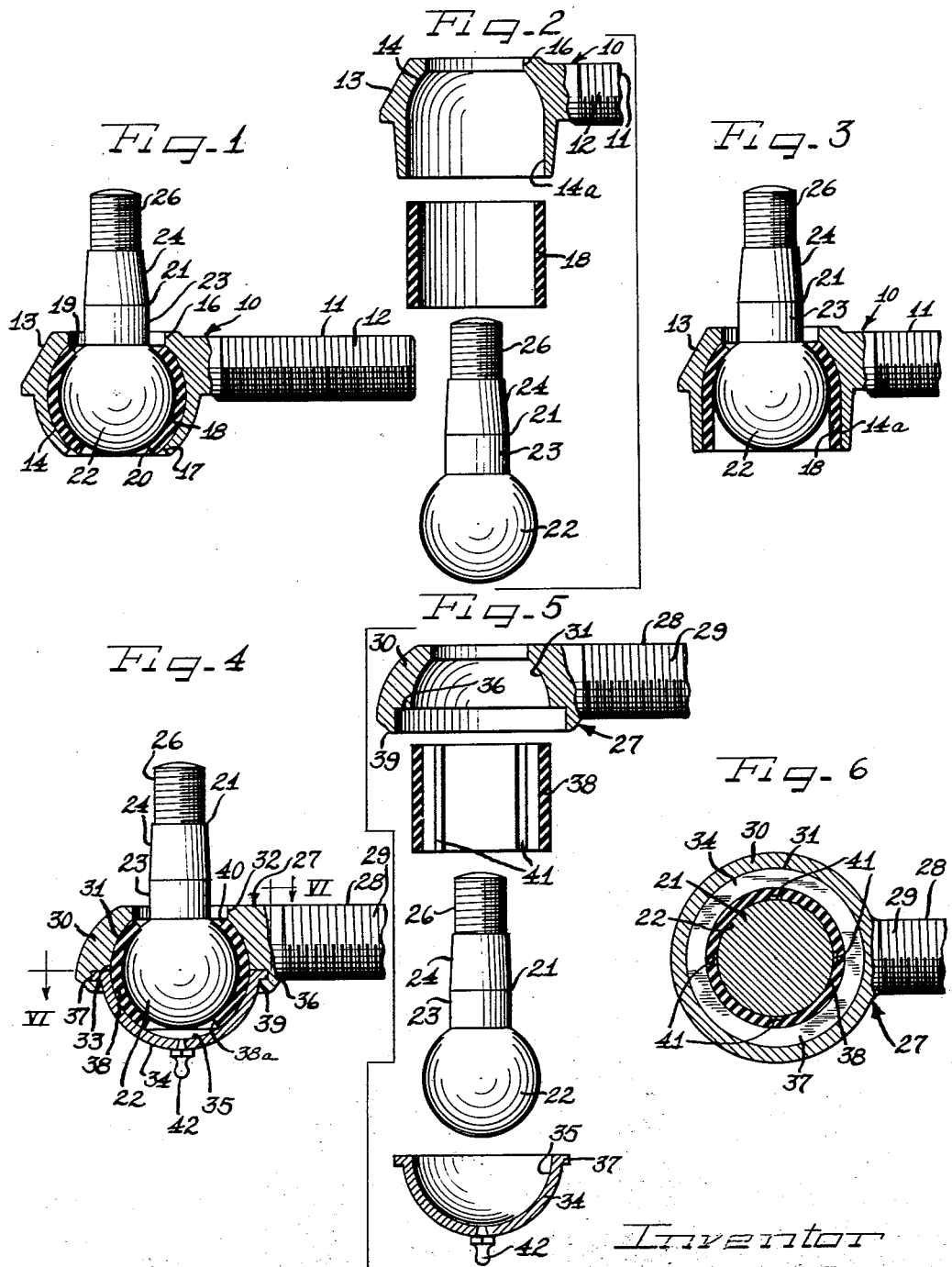

2,715,766

METHOD OF MAKING A JOINT ASSEMBLY

Bernard E. Ricks, Detroit, Mich., assignor to Thompson Products, Inc., Cleveland, Ohio, a corporation of Ohio Application July 11, 1950, Serial No. 173,164

1 Claim. (Cl. 29—441)

This invention relates to improvements in methods of assembling ball joint assemblies in which a stud having a spherical ball head is rotatable and universally rockable in a housing.

More specifically, this invention relates to the method of making a ball joint assembly in which the spherical ball head of a stud is disposed in spherical bearing relation within a bearing shell of deformable material, which shell is disposed in complementary relationship within a spherical impression formed within a housing member.

According to this invention, a socket member or housing has a chamber provided, toward one end, with a segmental spherical bearing surface terminating in a reduced diameter opening. A substantially cylindrical bearing shell of deformable material is assembled about the spherical ball head of a stud. Said shell and stud assembly is then inserted, shank first, into the chamber in the housing with the stud shank extending through the reduced diameter opening. One end of the cylindrical bearing shell is deformed into complementary relationship between the segmental spherical bearing surface and the sperical ball head with the head in spherical bearing relation within the deformed bearing shell.

The open end of the chamber is then provided with a segmental spherical closure which serves to deform the other end of said bearing shell into complementary relationship between the closure and the spherical bearing head and to retain the stud head within the housing. Thus, the stud is held with its head in substantially full spherical bearing relationship within the bearing shell which in turn has been deformed into complementary relationsip with the segmental spherical surfaces provided within the housing and the clousre.

Means may be provided for lubricating the bearing surfaces, and such means may comprise impregnating the material of the bearing shell with lubricant or forming internal surface grooves within the bearing shell and forcing lubricant into the grooves in the assembled ball joint.

The joints of this invention are especially useful as tie rod ends in front wheel suspensions for automobiles. In such assemblies free rotation of the studs is required for steering movement, and at the same time universal movement of the studs relative to the tie rods is required to allow for non-coplanar movement of the steering arms relative to one another and to allow for manufacturing tolerances.

While tie rod ends are the preferred form of joints according to this invention, it should be understood that the invention is not limited to such specific types of joints since such universal joints are required in a multitude of different applications.

An object of the present invention is to provide a simple and novel method of fabricating a ball joint having a housing, a bearing shell and a stud with a spherical ball head.

A still further object of this invention is to provide an expeditious method for providing a segmental spherical closure at the open end of an assembled ball joint.

Other and further objects and features of this invention will be apparent to those skilled in the art from the following detail description of the annexed sheet of drawings which, by way of preferred examples, illustrate two embodiments of the invention.

On the drawings:

Figure 1 is a side elevational view, partly in section, of an assembled joint according to the present invention;

Figure 2 is an exploded view, partly in section, of the ball joint of Figure 1 showing the parts before assembly;

Figure 3 is a side elevational view, partly in section, of the ball joint of Figure 1 showing the parts in assembled relationship before the open end has been closed;

Figure 4 is a side elevational view, partly in section, showing an assembled second embodiment of the present invention;

Figure 5 is an exploded view, partly in section, of a ball joint of the type shown in Figure 4, showing the parts before assembly; and Figure 6 is a plan view, partly in section, taken substantially along lines VI—VI of Figure 4.

As shown on the drawings:

In Figure 1, the reference numeral 10 indicates generally an open-ended housing member having a laterally extending stem or arm 11 integral therewith. The arm 11 has external threads 12 for connection to an internally threaded tie rod end or the like. The housing 10 has an end portion 13 having a segmental spherical bearing impression therein with reduced diameter openings 16 and 17 at the upper and lower ends thereof, respectively.

A segmental spherical bearing shell 18 is disposed in complementary relationship within the segmental spherical impression 14 within the housing 10 and has an opening 19 at one end adjacent to the opening 16 and an opening 20 at its other end adjacent to the opening 17. The bearing shell 18 may be formed of any suitable deformable material but is preferably formed of pliable material such as rubber.

A stud 21 has a spherical ball head 22 which is disposed in spherical bearing relation within the bearing shell 18. The stud 21 has a short cylindrical shank portion 23 immediately adjacent the ball head 22. The cylindrical shank 23 extends upwardly through the opening 16 in the housing 10 with sufficient clearance between the edges of the opening 16 and the periphery of the shank 23 in order to allow for substantial universal tilting of the stud 21 relative to the housing 10. Immediately adjacent the shank portion 23 is a tapered portion 24 for inserting into a mating tapered hole in a connecting member, such as a steering arm (not shown). The tapered portion 24 is succeeded by a threaded end portion 26 to receive a nut (not shown) for holding the tapered portion 24 within the mating tapered hole in the connecting member.

In order to provide for free rotation and pivoting of ball head 22 within shell 18, the material used in fabrication of bearing shell 18 may have a lubricant such as graphite, paraffin or the like impregnating the material of the shell. The lubricant can be added to the material of the bearing shell 18 and mixed therewith before the material is put in solid fabricated form. However, the bearing assembly may be used without lubricant, in which case the rotation and tilting movement of the ball head 22 would be taken by the material of the bearing shell 18 in shear.

The simple and expeditious method of assembling the ball joint of Figure 1 is illustrated in Figures 2 and 3. According to this method the housing 10 has end portion 13 with its upper part having opening 16 therein and the upper portion of the segmental spherical bearing impression 14 formed therein as described in connection with Figure 1. The lower section of the end portion 13, designated by reference numeral 14a, is formed as a cylindrical chamber of a diameter substantially equal to the spherical diameter of the segmental spherical impression 14. The bearing shell 18 may be expeditiously formed of tubular stock, and before insertion into the housing 10 the bearing shell 18 is of cylindrical form having an outside diameter substantially equal to the inside diameter of the cylindrical portion 14a of the housing 10.

The stud 21, as described in connection with Figure 1, is first assembled with spherical head 22 within the bearing shell 18. The bearing shell and stud assembly is then inserted upwardly into the open end of the cylindrical portion 14a until the upper part of the bearing shell 18 is deformed into mating complementary relationship between the upper half of the segmental spherical impression 14 and the spherical head 22 of the stud 21. While the spherical ball head 22 and the deformed end of the bearing shell 18 are held in complementary relationship against the upper part of the segmental spherical impression 14, the lower section of the end portion 13 is spun over or rolled over radially inwardly to form the lower portion of the segmental spherical impression 14, as shown in Figure 1. Hence, the former cylindrical surface 14a is transformed into a substantially spherical surface, and the lower end of bearing shell 16 is deformed into complementary relationship between the newly formed spherical surface and the spherical head 22 of the stud 21, as shown in Figure 1.

Figures 4, 5 and 6 illustrate a second embodiment of the invention. As shown in Figure 4, a housing, generally designated at 27, has an integral arm 28 with external threads 29 thereon for connecting with an internally threaded tie rod end or the like (not shown). The housing 27 has an end portion 30 having a segmental spherical bearing impression 31 therein terminating in a reduced diameter opening 32 at the upper end of the end portion 30. A larger diameter opening 33 at the lower end of the end portion 30 is closed by a semi-spherical cap 34 which has an inner segmental spherical surface 35 forming substantially a continuation of the spherical surface 31 within the end portion 30. The cap 34 has a radially outwardly extending flange 37 about its upper periphery, said flange being disposed within a mating peripheral groove 36 formed in the end portion 30 about the opening 33. A peripheral flange 39 located about the groove 36 is formed over the flange 37 in order to retain the cap 34 in fixed relationship to the end portion 30 of the housing 27.

A deformable bearing shell 38 of pliable material such as rubber is disposed in complementary relationship within the spherical chamber formed between the end portion 30 and the cap 34. The bearing shell 38 has a lower aperture 38a and an upper aperture 40 therethrough, the upper aperture 40 being adjacent to the opening 32 at the upper end of the end portion 30.

The stud 21, as described in connection with Figure 1, is disposed with the spherical ball head 22 in spherical bearing relation within the bearing shell 38 in pivotal and rotatable contact therewith.

It is readily apparent that the bearing shell 38 could be identical to bearing shell 18. However, an alternate type having a plurality of longitudinal grooves 41 along the inner surface (Figures 5 and 6) is herein disclosed. The longitudinal grooves 41 are provided as lubricant channels or reservoirs for supplying lubricant between the complementary bearing surfaces on the spherical head 22 and the bearing shell 38, respectively. A lubricant fitting 42 is inserted through a hole in the lowermost portion of the cap 34. Lubricant forced in through the fitting 42 will fill the aperture 38a at the lower end of the bearing shell 38 and then will be forced upwardly through the grooves 41 to opening 32 at the upper end of the end portion 30 of the housing 27. Lubrication of the mating spherical bearing surfaces will be accomplished as long as a supply of the lubricant is maintained within the grooves 41.

Figure 5 illustrates the various parts used in forming the bearing joint assembly of Figure 4 before the parts are so assembled. In order to accomplish the assembly the stud 21 is first assembled with the spherical head 22 within the bearing shell 38. The bearing shell and stud assembly is then inserted upwardly, shank end first, into the segmental spherical impression 31 within the end portion 30 of the housing 27 until the upper portion of the bearing shell 38 is deformed into complementary relationship between the spherical impression 31 and the spherical ball head 22. The semi-spherical cap 34 is then inserted upwardly into the annular groove 36 at the lower end of the end portion 30, and then the annular flange 39 is spun over or rolled over the annular flange 37 on cap 34 to retain the cap 34 in fixed engagement with the housing 27, as described in connection with Figure 4. Hence, the lower portion of bearing shell 38 will be deformed into complementary relationship between the spherical surface 35 of the semi-spherical cap 34 and the spherical ball head 22 of the stud 21.

It will be seen from the above description that this invention provides a simple and expeditious method of forming the joint assembly as described.

It will be understood that modifications and variations may be effected without departing from the scope of the novel concepts of the present invention.

I claim as my invention:

The method of making a ball joint which comprises forming a housing having a segmental spherical impression therein terminating at one end in a reduced diameter opening and at the other end in a substantially diametrical opening, forming a counterbore bottomed by a shoulder in the end of said housing adjacent said diametrical opening, forming a substantially cylindrical bearing shell of rubber-like material having a plurality of longitudinal grooves along the inner surface thereof, assembling a spherical ball head of a stud within said bearing shell, inserting said stud and bearing shell assembly into said segmental spherical impression and deforming one end of said bearing shell into complementary relation between said impression and said ball head, assembling a cap having a substantially semi-spherical impression therein over the diametrical opening at one end of said spherical impression to deform the other end of said bearing shell into complementary relation between said ball head and the semi-spherical surface of said cap, said cap having a radially outwardly directed annular flange therearound disposed in mating relation within said counterbore, forming radially inwardly the housing portion about said counterbore to fixedly retain said cap against said shoulder thereby retaining said spherical ball head in universally rotatable spherical bearing relation within said bearing shell, and assembling a lubricating fitting through said cap to permit application of lubricant to said mating bearing surfaces through the longitudinal grooves along the inner surface of said bearing shell.

References Cited in the file of this patent

UNITED STATES PATENTS

| | | |
|---|---|---|
| 634,204 | Diehl | Oct. 3, 1899 |
| 1,555,214 | Johnson | Sept. 29, 1925 |
| 1,916,744 | Skillman | July 4, 1933 |
| 2,027,560 | Skillman | Jan. 14, 1936 |
| 2,096,557 | Peo | Oct. 19, 1937 |
| 2,227,969 | Haushalter | Jan. 7, 1941 |
| 2,292,675 | Thiry | Aug. 11, 1942 |
| 2,324,083 | Holmes | July 13, 1943 |
| 2,425,138 | Venditty | Aug. 5, 1947 |
| 2,461,626 | Booth | Feb. 15, 1949 |
| 2,537,629 | Brown | Jan. 9, 1951 |

FOREIGN PATENTS

| | | |
|---|---|---|
| 728,933 | France | Apr. 19, 1932 |
| 964,902 | France | Feb. 8, 1950 |